(12) United States Patent
Nitenson et al.

(10) Patent No.: US 7,083,141 B2
(45) Date of Patent: Aug. 1, 2006

(54) SELF-PROPELLED PROJECTILE

(76) Inventors: Edward Nitenson, 653 Greenway Manor Dr. #B, Florissant, MO (US) 63031; Robert Cumings, 20 Burl Dr., St. Peters, MO (US) 63376

( * ) Notice: Subject to any disclaimer, the term of this patent is extended or adjusted under 35 U.S.C. 154(b) by 0 days.

(21) Appl. No.: 10/725,100

(22) Filed: Dec. 2, 2003

(65) Prior Publication Data

US 2005/0116084 A1 Jun. 2, 2005

(51) Int. Cl.
*B64C 5/12* (2006.01)
(52) U.S. Cl. .................... 244/3.28; 124/57; 124/81; 124/85; 102/376
(58) Field of Classification Search ............ 124/57, 124/81, 85; 102/376, 211, 457; 244/3.28; 446/36, 212
See application file for complete search history.

(56) References Cited

U.S. PATENT DOCUMENTS

| | | | | | |
|---|---|---|---|---|---|
| 23,827 | A | * | 5/1859 | Comins | 244/3.28 |
| 2,405,415 | A | * | 8/1946 | Eksergian | 244/3.23 |
| 2,588,184 | A | * | 3/1952 | Remington | 446/212 |
| 3,098,446 | A | * | 7/1963 | Raymond | 244/3.28 |
| 3,142,293 | A | * | 7/1964 | Harter | 124/57 |
| 3,196,793 | A | * | 7/1965 | Veljko et al. | 244/3.28 |
| 3,417,719 | A | * | 12/1968 | Edward | 114/20.1 |
| 3,986,684 | A | * | 10/1976 | Marburger et al. | 244/3.28 |
| 4,334,657 | A | * | 6/1982 | Mattson | 244/3.28 |
| 5,413,514 | A | * | 5/1995 | Milligan | 446/36 |
| 5,499,619 | A | * | 3/1996 | Tarta | 124/57 |
| 5,909,000 | A | * | 6/1999 | Rakov | 89/7 |
| 6,695,252 | B1 | * | 2/2004 | Dryer | 244/3.28 |

* cited by examiner

*Primary Examiner*—Galen Barefoot
(74) *Attorney, Agent, or Firm*—Henry W. Cummings

(57) ABSTRACT

A self-propelled projectile which will maintain a straight trajectory through air or water.

2 Claims, 6 Drawing Sheets

SELF-PROPELLED PROJECTILE

I FIELD OF THE INVENTION

This invention relates to a self-propelled projectile which can be fired either from underwater or from the air at any target, underwater or in air.

II BACKGROUND OF THE INVENTION

U.S. Pat. No. 3,031,967 discloses a fin arrangement for projectiles. The projectiles detailed in this invention are those which are fired into the air with an explosive charge, and utilize folding fins designed to withstand said charge. The fins fold out from the projectile, rather than extend straight out as in the present invention.

U.S. Pat. No. 3,165,281 discloses elastic folding control surfaces for aerodynes. As in the previous reference, the aerodynes described are those designed to be fired into the air, and employ folding control surfaces.

U.S. Pat. No. 3,589,645 discloses foldout fins forming stable flight for a nonspinning projectile. As in the previous two references, the fins fold out from the body of the projectile by means of gas pressure from the firing charge. This projectile is also designed to be fired into the air.

U.S. Pat. No. 3,929,370 discloses an aerodynamically stabilized projectile system for use against self-propelled objects. This projectile is designed to be fired into water from the air, and employs means to avoid course deviation resulting from air/water interface. It is not self-propelled, nor does it employ fins (folding or otherwise) for stabilization.

III SUMMARY OF THE INVENTION

A. Objects of the Invention

One object of the present invention is to provide a self-propelled projectile which utilizes a common CO2 or inert gas cartridge as part of its structure and as propulsion means.

Another object of the present invention is to provide a self-propelled projectile having controlling means to redirect gases from the CO2 or inert gas cartridge in a predictable manner to ensure a straight trajectory.

Another object of the present invention is to provide a self-propelled projectile employing retractable fins which further ensure the self-propelled projectile travels in a straight trajectory.

B. Summary

A self-propelled projectile comprising a gas cartridge, a projectile body, a nozzle exhaust and projectile direction controlling means. This provides an economical means of providing a self-propelled projectile which will maintain a straight trajectory through air or water.

IV. THE DRAWINGS

V. DESCRIPTION OF PREFERRED EMBODIMENTS

Figure 1:
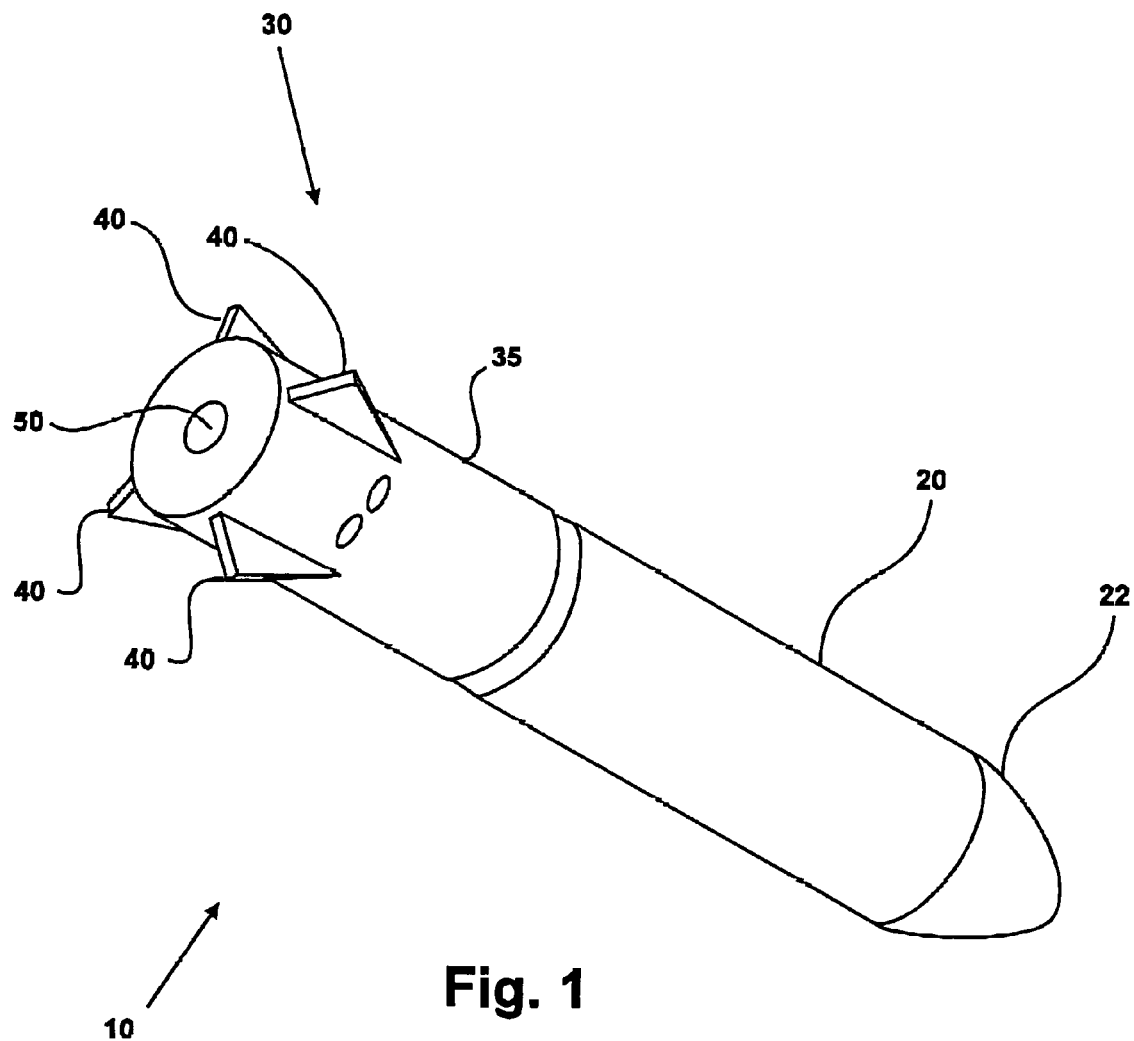
FIG. 1 is a perspective view of the present invention, showing all its component parts.

In accordance with the present invention, FIG. 1 shows the present invention generally at 10. The major parts comprising the invention are the CO2 or inert gas cartridge 20, nozzle assembly 30, and fins 40. CO2 or inert gas cartridge 20 is a standard commercially available cartridge which is secured to nozzle assembly 30 by threads or other means external to CO2 or inert gas cartridge 20 and internal to nozzle assembly 30. Nozzle assembly 30 is the controlling means for projectile 10 and comprises body 35, and resilient means such as a metal spring or other resilient material for spring-loaded cantilever control of fins 40 and exhaust 50. Body 35 is machined from high impact plastic, aluminum, steel, or other resilient material suitable for the application. The interior or body 35 is shaped in such a manner as to contain the gas released from CO2 or inert gas cartridge 20 and redirect it evenly out exhaust 50 so as to ensure a straight trajectory.

Figure 3:
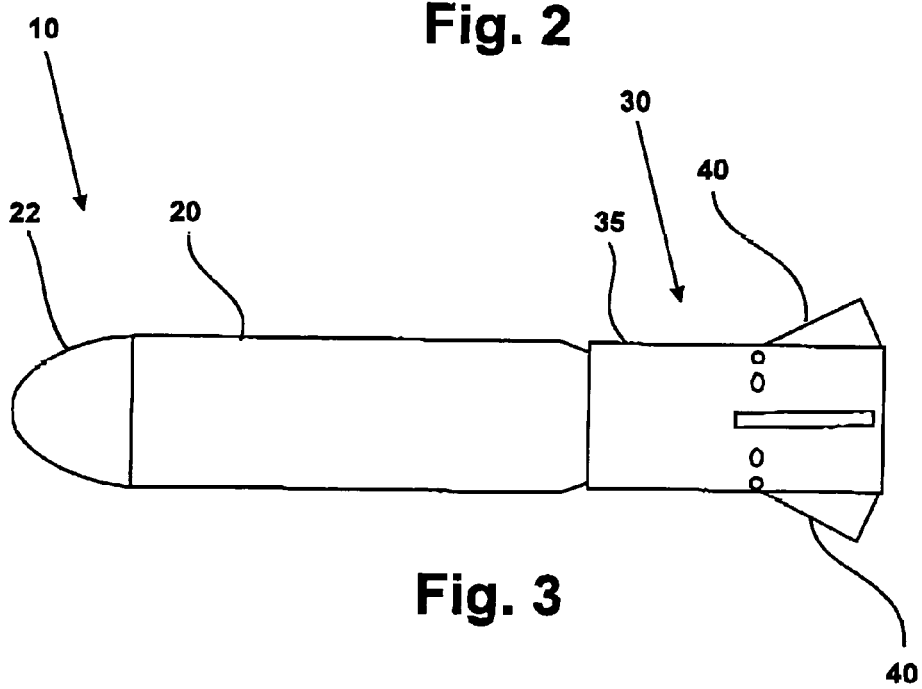
FIG. 3 is a side view of the present invention, showing the fins extended, as it would appear after firing.

FIG. 3 shows the present invention with fins 40 extended from nozzle assembly 30, as would be the case after firing, or before being loaded in a firing tube, with impact head 22 containing explosive material such as dynamite, C4 or equiv., threaded, soldered, or cemented to cartridge 20.

Figure 2:
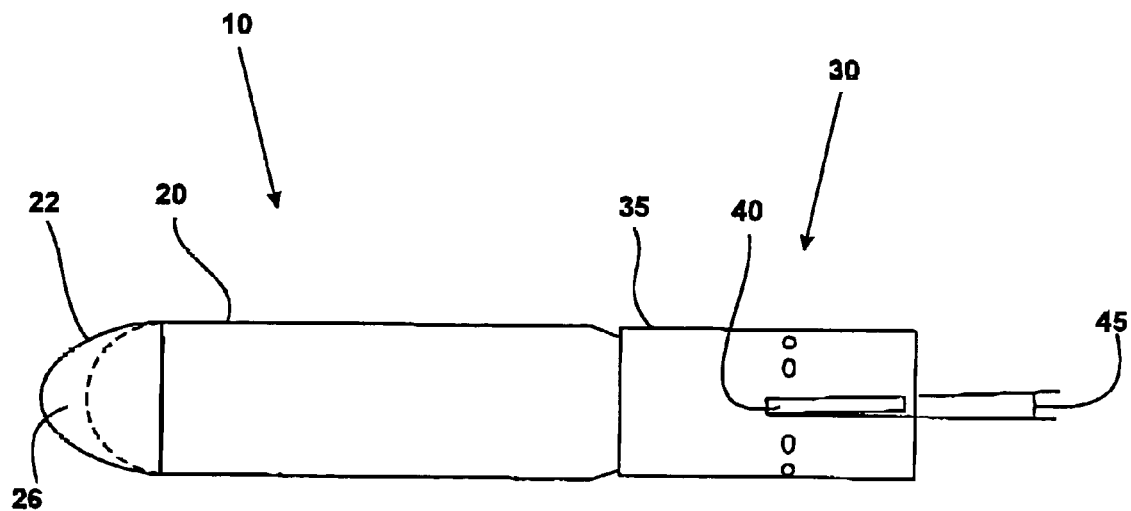
FIG. 2 is a side view of the present invention, showing the fins retracted, as it would appear when placed in a firing tube.

FIG. 2 shows the present invention with fins 40 internal to nozzle assembly 30, as would be the case when loaded in a firing tube. Fins 40 are mounted to body 35 at an angle 45.

Figure 4A:
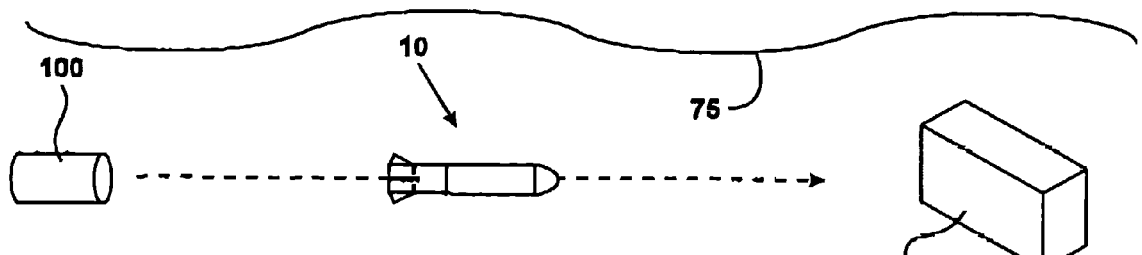
FIG. 4A is a view showing the present invention being fired from underwater at an underwater target.

FIG. 4A illustrates self-propelled projectile 10 being fired from firing tube 100 under the surface of water 75 at an underwater target 200.

Figure 4B:
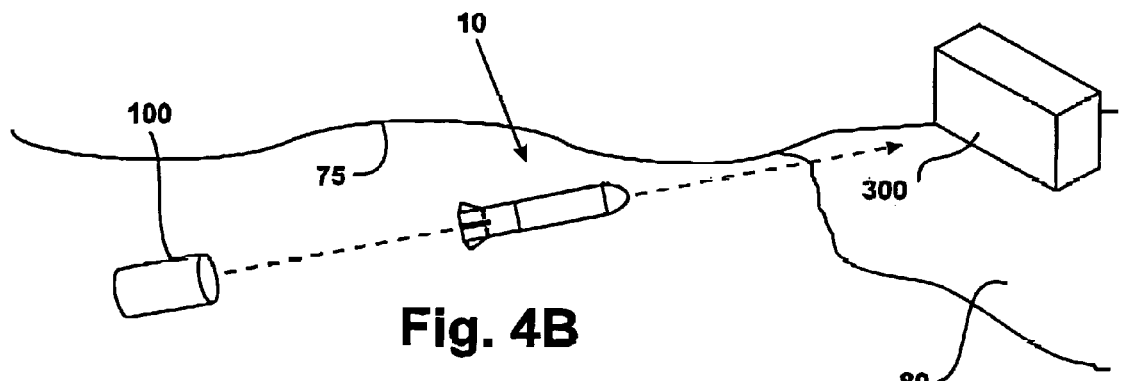
FIG. 4B is a view showing the present invention being fired from underwater at an above water target.

FIG. 4B illustrates self-propelled projectile 10 being fired from firing tube 100 under the surface of water 75 at target 300, resting on ground 80.

Figure 4C:
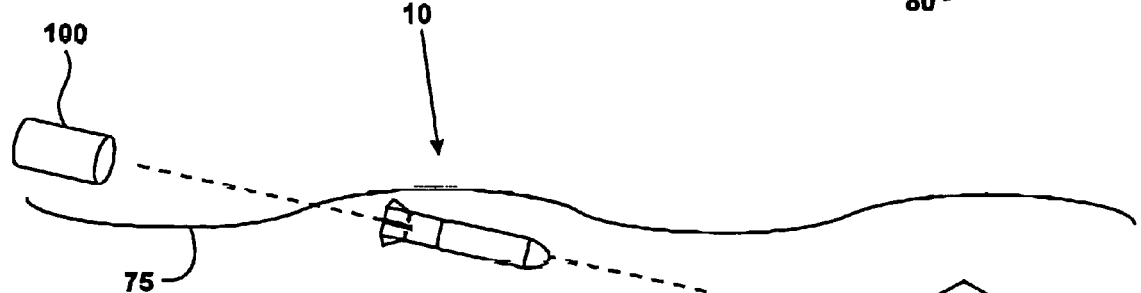
FIG. 4C is a view showing the present invention being fired from above water at an underwater target.

FIG. 4C illustrates self-propelled projectile 10 being fired from firing tube 100 above the surface of water 75 at an underwater target 200.

Figure 4D:
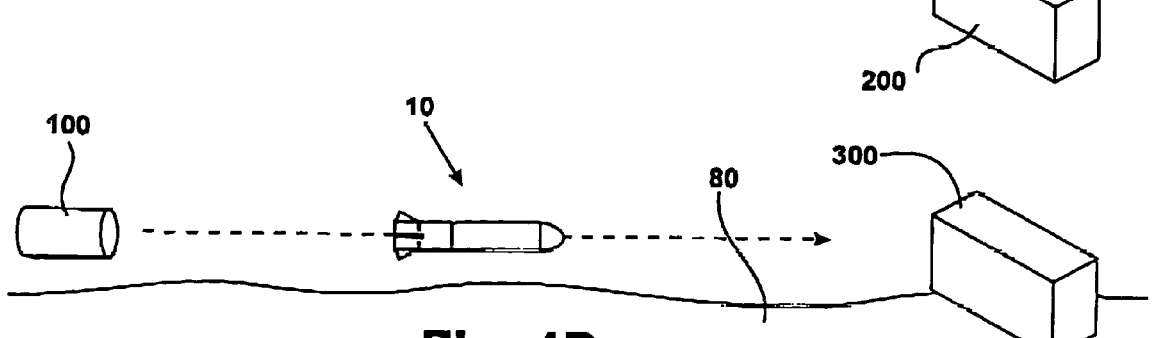
FIG. 4D is a view showing the present invention being fired from above water at an above water target.

FIG. 4D illustrates self-propelled projectile 10 being fired from firing tube 100 above the surface of ground 80 at an above ground target 300.

Figure 5:
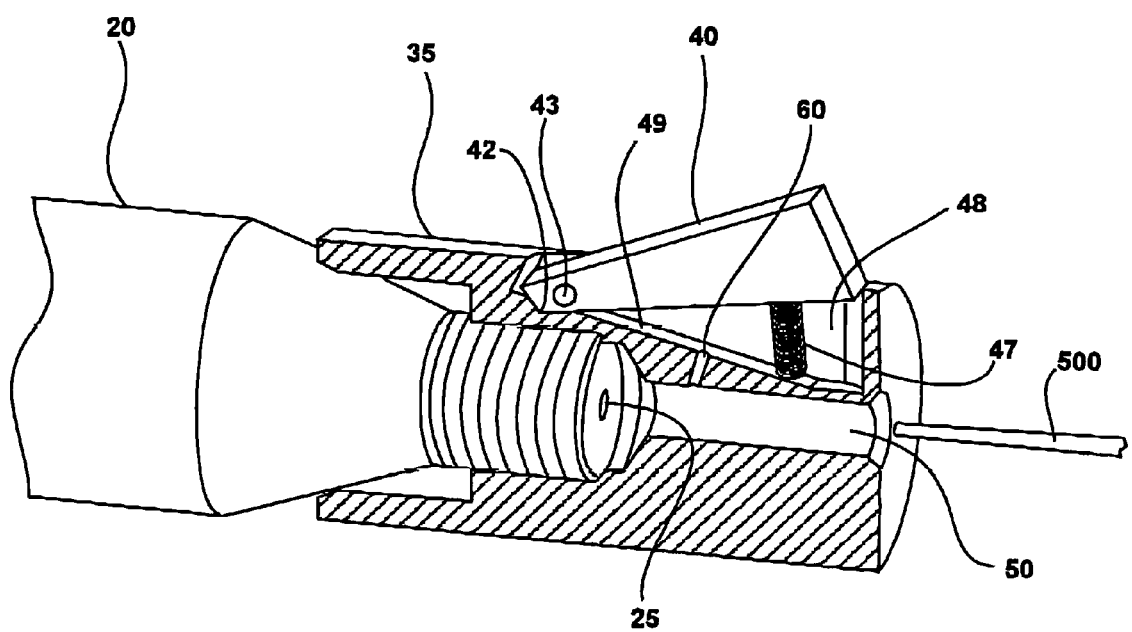
FIG. 5 is a cutaway view of one embodiment of the present invention showing fin mounting detail.
Figure 5A:
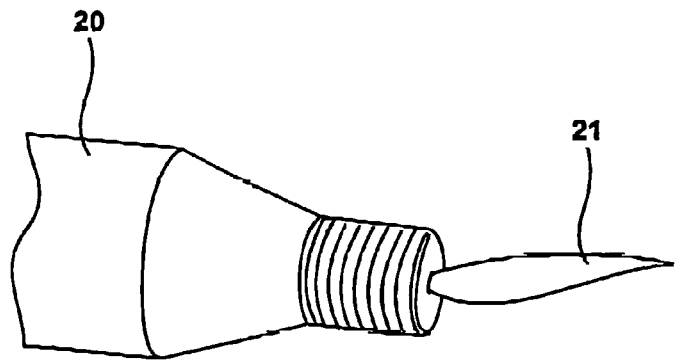
Figure 5B:
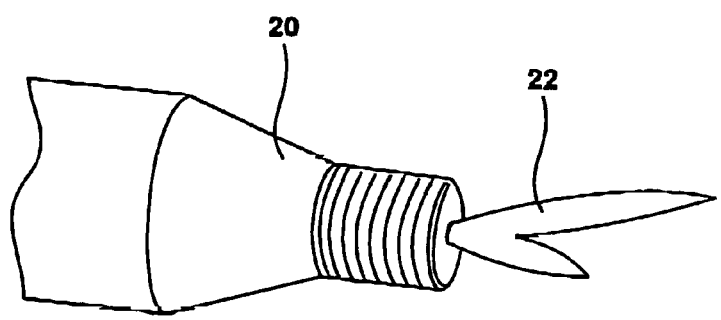
Figure 5C:
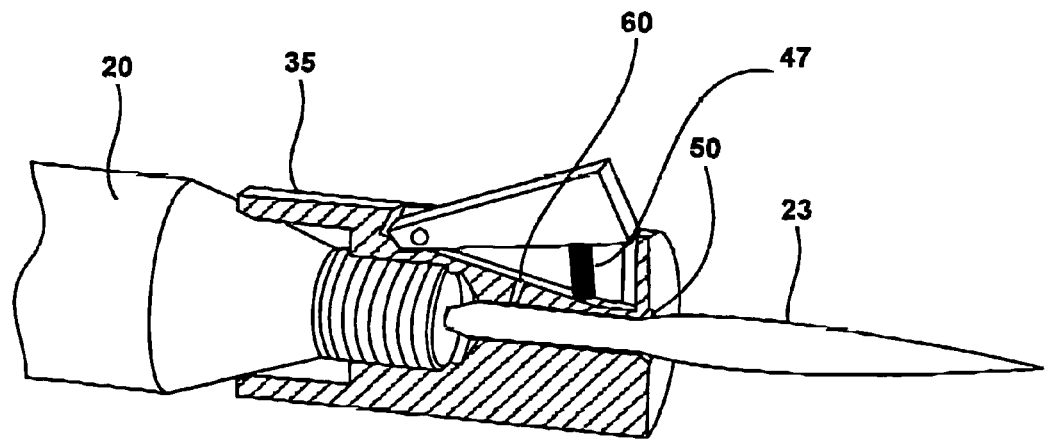
Figure 6:
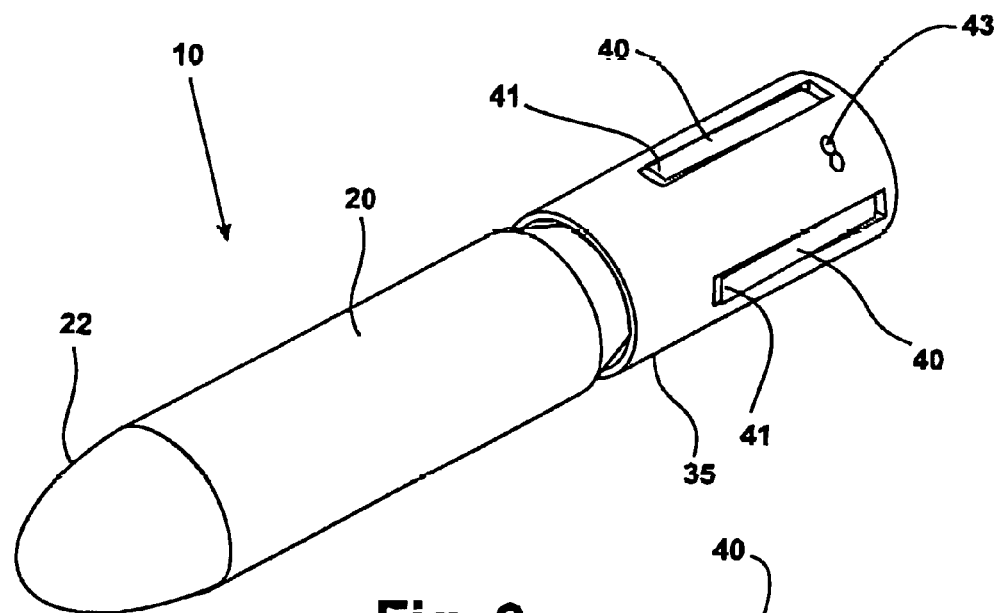
FIG. 6 shows another embodiment of the present invention with its fins retracted in the opposite direction from the first embodiment.
Figure 7:
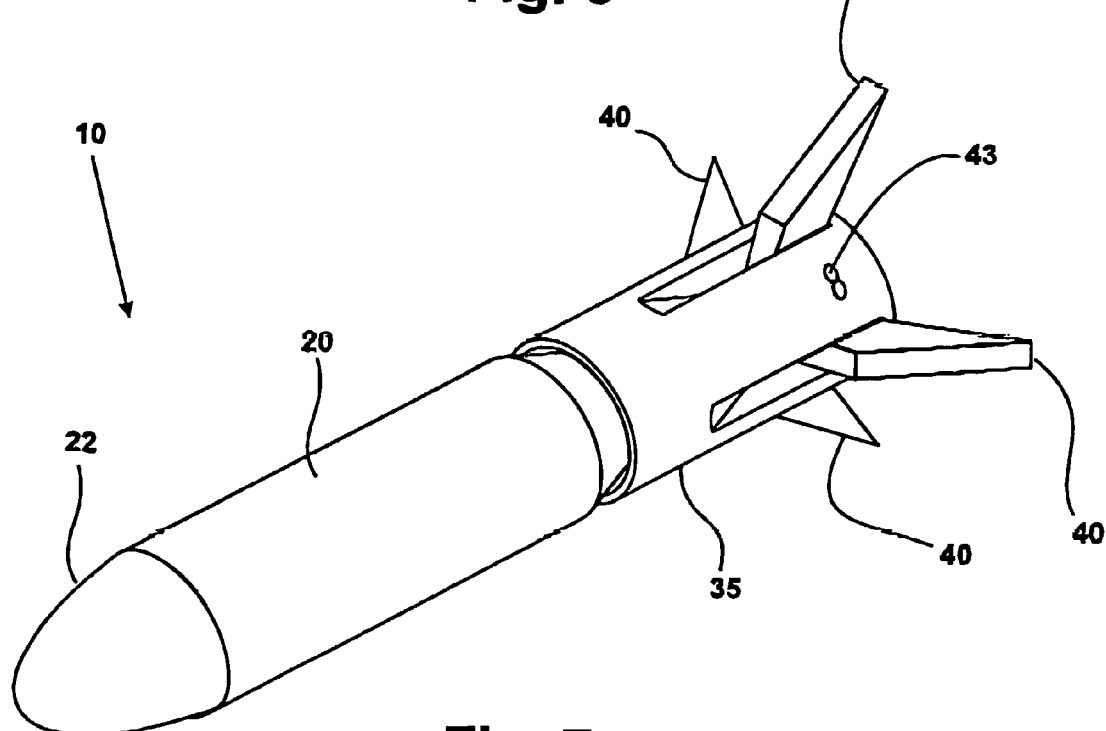
FIG. 7 shows the embodiment illustrated in FIG. 6 with its fins extended in the opposite direction from the first embodiment.

Referring to FIG. 5, in use, a firing pin (not shown) internal to the gun or firing tube, enters body 35 via exhaust 50 and pierces a seal 25 in the rear of CO2 or inert gas cartridge 20, releasing the pressurized gas. This gas may be CO2 or inert gas cartridge 20 at any angle, or even in a split stream, but is contained by the cavity internal to body 35. The pressurized gas then exits body 35 via exhaust 50 in a clean, straight stream, forcing self-propelled projectile 10 forward out of the firing tube. As self-propelled projectile 10 clears the firing tube, springs 47 (FIG. 5) force fins 40 out of their resting places 48 in body 35, pivoting on pins 43. (Note: A coil spring is shown but other types of spring may be used.). In addition, gas pressure found in nozzle exhaust 50 is forced up gas port 60, to ensure fins 40 extend and stay extended. Fins 50 are prevented from extending further than desired by means of fin corner 42 impacting fin cavity bottom 49. Fins 40 interact with air or water at angle 45, imparting a stabilizing spin to self-propelled projectile 10.

What is claimed is:

1. A self-propelled explosive head projectile comprising:
   a projectile body,
   a nozzle exhaust and
   projectile propulsion means;
   projectile direction controlling means;
   a gas cartridge being a part of said projectile body and projectile propulsion means;
   and wherein said projectile direction controlling means comprise said body, and nozzle exhaust and resilient loaded fins located within slots in said body;
   and wherein said resilient loaded fins are retractable and mounted at an angle and cantilevered to said body in order to impart a stabilizing spin to said self-propelled projectile when interfaced with water and/or air;
   means to support said resilient means within said slots for each fin, said slots formed into said nozzle, and whereby said resilient means extend automatically after leaving a firing tube; whereby the means to control the angle of extension of said fins is controlled beyond the diameter of the cartridge/projectile after leaving the firing tube.

2. A self-propelled projectile according to claim 1 wherein wherein said nozzle exhaust is machined to provide a straight, clean path for exhausting the pressurized gas from said gas cartridge.

* * * * *